(12) United States Patent
Jordan et al.

(10) Patent No.: US 12,079,173 B2
(45) Date of Patent: Sep. 3, 2024

(54) SEGMENTED STREAMING DATA PROCESSING

(71) Applicant: Fluency Corp., Greenbelt, MD (US)

(72) Inventors: Christopher Jordan, Great Falls, VA (US); Kun Luo, Ellicott City, MD (US)

(73) Assignee: FLUENCY CORP., Greenbelt, MD (US)

( * ) Notice: Subject to any disclaimer, the term of this patent is extended or adjusted under 35 U.S.C. 154(b) by 145 days.

(21) Appl. No.: 17/381,304

(22) Filed: Jul. 21, 2021

(65) Prior Publication Data

US 2022/0327099 A1 Oct. 13, 2022

Related U.S. Application Data (60) Provisional application No. 63/173,866, filed on Apr. 12, 2021.

(51) Int. Cl.
*G06F 16/00* (2019.01)
*G06F 16/18* (2019.01)

(52) U.S. Cl.
CPC .............................. *G06F 16/1805* (2019.01)

(58) Field of Classification Search
CPC ............................ G06F 16/1805; G06F 17/40
See application file for complete search history.

(56) References Cited

U.S. PATENT DOCUMENTS

| | | | |
|---|---|---|---|
| 10,936,585 B1* | 3/2021 | Echeverria | G06N 5/00 |
| 2016/0357809 A1* | 12/2016 | Patel | G06F 16/2471 |
| 2016/0359708 A1* | 12/2016 | Gandham | H04L 45/38 |
| 2017/0193039 A1* | 7/2017 | Agrawal | G06F 16/245 |
| 2018/0089258 A1* | 3/2018 | Bhattacharjee | G06F 16/24535 |
| 2019/0310977 A1* | 10/2019 | Pal | G06F 9/5077 |
| 2020/0099614 A1* | 3/2020 | Vutharkar | G06F 7/14 |
| 2020/0167360 A1* | 5/2020 | Rath | G06F 16/252 |

* cited by examiner

*Primary Examiner* — Syed H Hasan
(74) *Attorney, Agent, or Firm* — Slater Matsil, LLP (57) ABSTRACT

The disclosure relates generally to a method, device, and system for creating a searchable data store with an infinite retention period for streaming documents. In an embodiment, a method of storing data includes receiving an incoming stream of time-series data; storing the time-series data of the incoming data stream in a first segment; and closing the first segment in response to a resource consumption limit of the first segment being reached.

20 Claims, 8 Drawing Sheets

Figure 1

```
{
    "@type":"metaflow",
    "dip":"23.204.175.39",
    "dp":80,
    "prot":6,
    "d_country":"US",
    "http":{
        "host":"go.microsoft.com",
        "uris":[
            { "cmd":"GET", "status":0, "uri":"/fwlink/" }
        ]
    },
    "sip":"192.168.254.70",
    "sp":55096,
    "start_ms":1614377893973
}
```

Partition State Table

| ID | Segment | Shard | State | MinTs | MaxTs | Index Size | Storage Path | Data Version | ... |
|---|---|---|---|---|---|---|---|---|---|
| 100 | 1 | 1 | Archived | 2021-0101 00:00:00 | 2021-0101 08:10:02 | 16GB | S3://lvdb p100/... | 3.0 | |
| 101 | 2 | 3 | Closed | 2021-0101 08:10:00 | 2021-0102 16:00:00 | 16GB | - | 3.0 | |
| 102 | 2 | 3 | Live | 2021-0102 15:55:10 | 2021-0103 08:01:20 | 16GB | - | 3.0 | |

Figure 8

SEGMENTED STREAMING DATA PROCESSING

CROSS-REFERENCE TO RELATED APPLICATIONS

This application claims the benefit of U.S. Provisional Application No. 63/173,866, filed on Apr. 12, 2021, which application is hereby incorporated herein by reference.

TECHNICAL FIELD

The disclosure relates generally to a method, device, and system for creating a searchable data store with an infinite retention period for streaming documents.

BACKGROUND

The present disclosure relates generally to storing and indexing raw data logs. Conventional approaches to storing and indexing data logs include uploading the data logs to cold storage systems and storing the data logs in large databases. The databases segment the data logs stored therein based on defined time windows, such as by day or by hour. In order to perform searches on the data logs, an entire database must be downloaded to hot storage, before being searched. This requires high costs and takes up significant time. As such, alternative approaches are desired.

SUMMARY

General aspects of the disclosure herein describe a method, device, and system for providing full streaming support over an infinite time period. The method, device, and system operate on a cloud infrastructure, where resources are available on-demand. The method, device, and system include dividing an incoming stream of data into logical segments. The method, device, and system allow for continuous upgrading on both the engine and schema, and allow for historical data to be re-indexed with the latest engine and schema. The method, device, and system allow for on-demand sharding and dynamic adjustment of resources based on the current input rate or the amount of storage to be searched. The method, device, and system allow for on-demand searching and provide the most efficient solution for a search over a long period of time.

Benefits from the disclosed method, device, and system include the ability to store huge amounts of raw data logs in a format that supports forensic analysis at an affordable price. The method, device, and system allow data schemas or the engine to be updated, while maintaining the availability of stored data. The method, device, and system further reduce the operational cost of indexing raw events (e.g., more than 90% cost reduction compared to conventional solutions) and utilize new features provided by cloud infrastructures.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

The method, device, and system of the current application may be used to organize data from an input stream into a searchable data store. The input stream may include a continuous stream of data. In some embodiments, the input stream includes documents having a JavaScript Object Notation (JSON) format. In some embodiments, the input stream may include documents having raw event formats, such as Log Event Extended Format (LEEF), Common Event Format (CEF), or the like. In some embodiments in which the input stream includes documents having formats other than the JSON format, the documents of the input stream may be converted into the JSON format. The input stream may contain documents having multiple different data types. A pre-defined schema may contain a field mapping of all data types. Each document in the input stream includes a timestamp field. For data streams where records do not have timestamps already attached, the receiving time of the record can be used for the timestamp field. For example, the receiving time may be attached to the record in the timestamp field and may be referred to as a supplemental timestamp.

Each of the documents from the input stream (i.e., the input documents) are packaged into a compressed archive file (i.e., an archive). Each of the documents may include a timestamp field. Each archive holds up to a fixed amount of documents, a fixed data limit, documents from a pre-defined time interval (e.g., 200,000 documents, 100 MB raw size, a 30-second time interval, or the like), or the like. Each archive has a "Collection Time" attached as one of the attributes (e.g., a range from a start time to an end time).

The input archive will be placed in a global message queue, which may be organized by a first in, first out (FIFO) method. The input archive allows for open access to all active shards.

Figure 1:
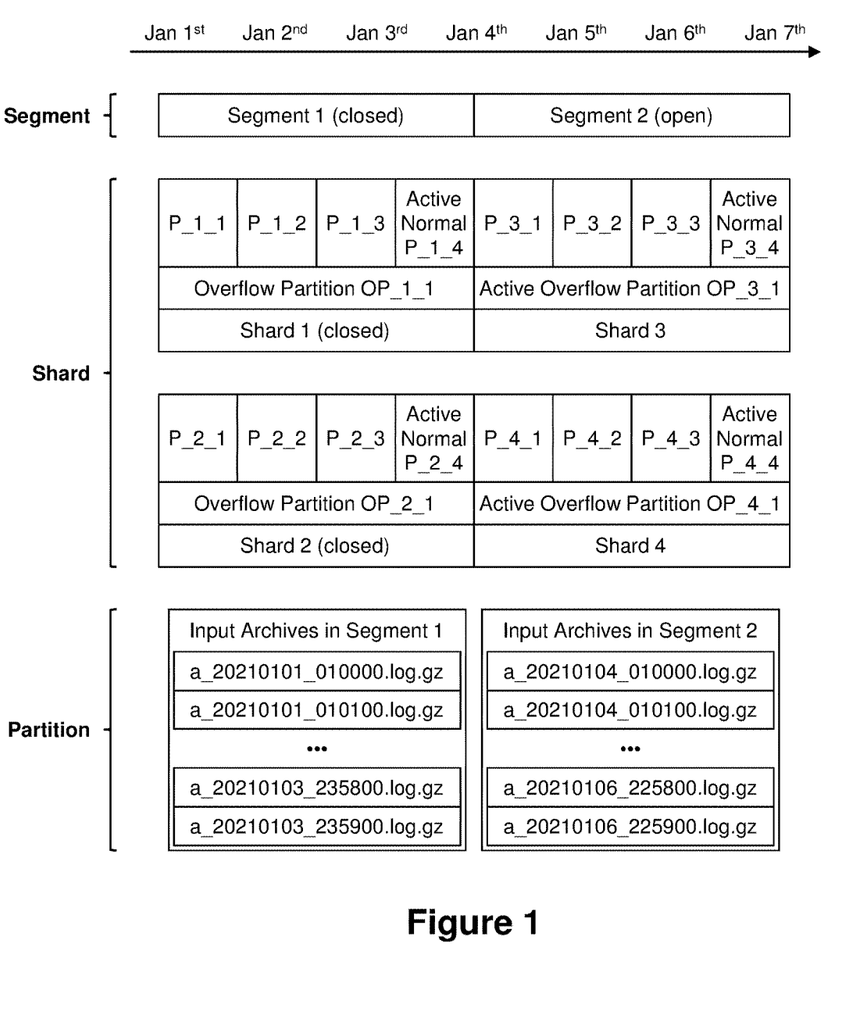
FIG. 1 is a block diagram of an architecture hierarchy, in accordance with an embodiment.

FIG. 1 illustrates a block diagram of an architecture according to an embodiment. As illustrated in FIG. 1, an input stream may be divided into multiple segments, one of which is open at any time. One or more shards may be active in each of the segments. For example, Shards 1 and 2 were active in Segment 1 and Shards 3 and 4 are active in Segment 2. The shards act on the incoming data and place the data in partitions. One partition and one overflow partition may be active at any time. In the embodiment illustrated in FIG. 1, 4 partitions (P_1_1-P_1_4) and one overflow partition (OP_1_1) were active in Shard 1 and 4 partitions (P_2_1-P_2_4) and one overflow partition (OP_2_1) were active in Shard 2. Further in the embodiment illustrated in FIG. 1, 3 partitions (P_3_1-P_3_3) were previously active in Shard 3; one partition (P_3_4) and one overflow partition (OP_3_1) are currently active in Shard 3; 3 partitions (P_4_1-P_4_3) were previously active in Shard 4; and one partition (P_4_4) and one overflow partition (OP_4_1) are currently active in Shard 4.

A segment is a portion of the input stream divided by a collection window. One segment contains all archives collected in an initial time window (e.g., a window between time t1 and time t2). The time window for each segment is dynamic while the segment is active and is only fixed when the segment is closed. A segment may be closed when the number of documents stored in the segment reaches a limit, when the amount of data stored in a segment reaches a limit, when a schema or update is required to be performed, when a database administrator requests a rotation, when a time duration limit is reached, or the like. Once a segment is closed, the time window for the segment is established.

Each segment holds a list of the input archives. The input archives may be ordered based on the order in which they are received (e.g., the Collection Time). As such, when a search is performed on the input archives, the input archives are ordered in the order in which the input archives were received. Each input stream will have one "active" segment open. The segment will be "rotated" at a predefined period, or for an engine or a schema update. After the segment is rotated, the current active segment will be closed and a new segment will be active.

A segment could include multiple shards. A shard is hosted by one worker node. The worker node could be a physical server appliance or a virtual node on the cloud (such as AWS EC2). Active shards poll input events from a global message queue. Each input event contains the reference path to one input archive which is a list of JSON formatted documents to be processed.

Multiple shards may process data in parallel. There is no inter-communication between shards. In contrast to conventional approaches, the number of shard processing data at any time is dynamic (e.g., on-demand). The system will automatically adjust the shard count based on the input rate. A single input stream may start with one shard and increase to thousands of shards if necessary.

A partition is a collection of events within one time window. The time window for each of the partitions is open while the partition is active, and is defined after the partition is closed. In each shard, there is one normal partition, which is open to hold "in-line" events. The in-line events may be events that are received in order of the event's timestamps, or within a preconfigured jitter range from being in order. For example, if the timestamp of an incoming event is in the future by a duration greater than the preconfigured jitter range, the incoming event will not be placed in the normal partition. Another overflow partition is also open to hold "out of boundary" events (e.g., events with timestamps which are outside of the preconfigured jitter range). A partition is closed when it reaches a pre-configured size, a memory limit, or a time limit. In some embodiments, the partitions may be sized such that each partition can be searched by a single instance. Imagining a partition as a water bucket under a running faucet (e.g., an input stream), the bucket (partition) is replaced with a new one each time it is full. The time window for the partition is then defined after the partition is closed based on the events included in the partition.

A partition may have one of three states: live, closed, or archived. A live partition is a partition which is open for data input. The live partition may be append-only, meaning that events can be added to the live partition, but cannot be altered once they have been added. A closed partition may be read-only and be ready for search. An archived partition may be a closed partition, which is stored in a particular location (such as on the cloud). Multiple closed or archived partitions may be merged into a single partition. Each of the partitions includes a time window of all stored events. As such, a query based on a time range may determine exactly how many partitions are involved and may search only those partitions.

For high-speed streaming input, each of the partitions could include a narrow time window (e.g., a time window on the order of minutes). This ensures that all operations for a live partition can be sufficiently held in a memory. In addition, an overflow partition is open to hold all events that fall outside of a pre-configured jitter range (e.g., a current active time window). Thus, at any given time, each of the shards may store data in up to two live partitions.

Segments that are in a ready state, a live state, or a closed state are stored in hot storage, while segments that are in the archived state are stored in cold storage. Hot storage refers to data storage designed for immediate access and has fast input-output rates. An example of hot storage is AWS EBS. Cold storage refers to data storage whose retrieval times are beyond what is considered acceptable for online or production applications. An example of cold storage is AWS S3.

Each live partition may flush its state in a pre-configured time interval. A snapshot of the live partition may be taken and stored in a local file storage. The snapshots may be append-only operations. As such, data may be added to a previous snapshot, but data of a previous snapshot may not be altered.

Each live shard may be saved on a ZFS (Zettabyte file system) or other format snapshot of all the data included in the shard periodically. In some embodiments, for each snapshot, only the incremental difference with the previous snapshot will be uploaded to a long-term storage service.

Figure 2:
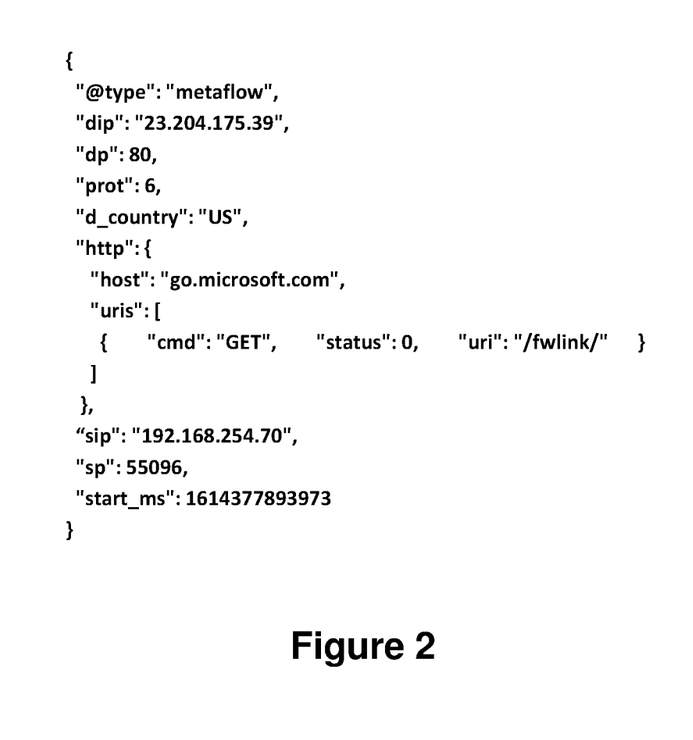
FIG. 2 is a streaming data input, in accordance with an embodiment.

FIG. 2 illustrates a JSON-formatted document, which may be part of a streaming data input. As illustrated in FIG. 2, the documents or events in the data input stream may include a timestamp field.

Figure 3:
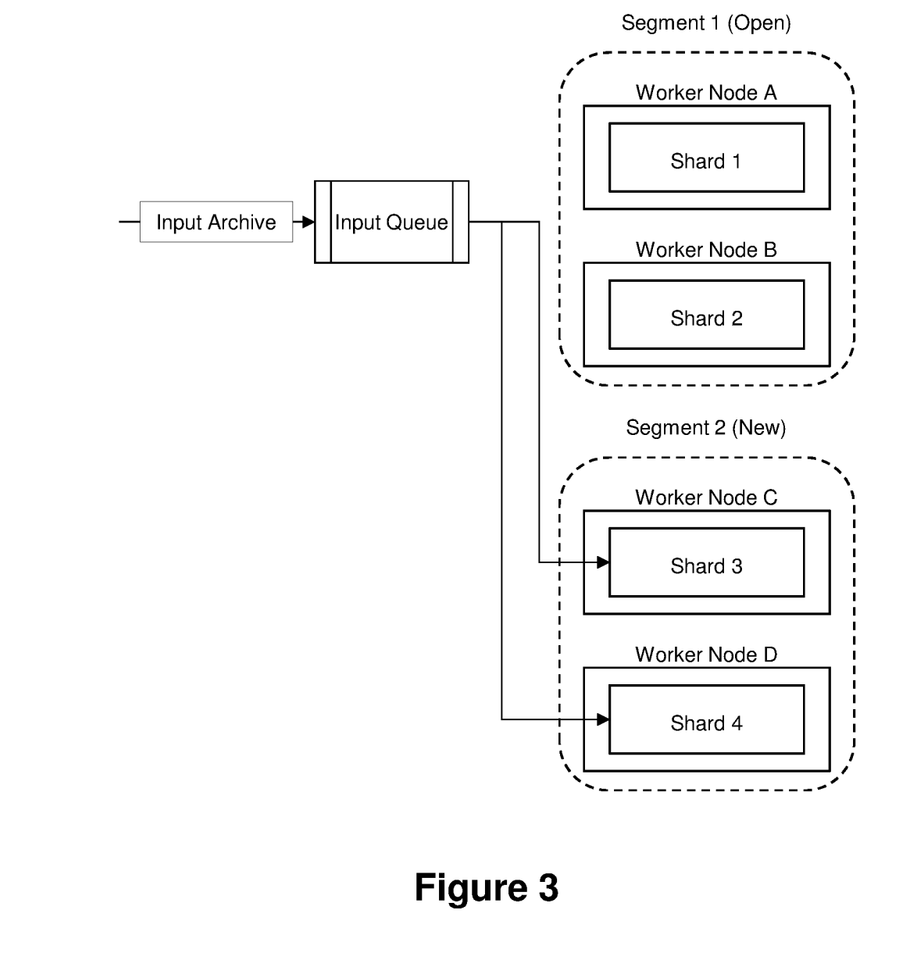
FIG. 3 is a block diagram of a segment prior to rotation, in accordance with an embodiment.
Figure 4:
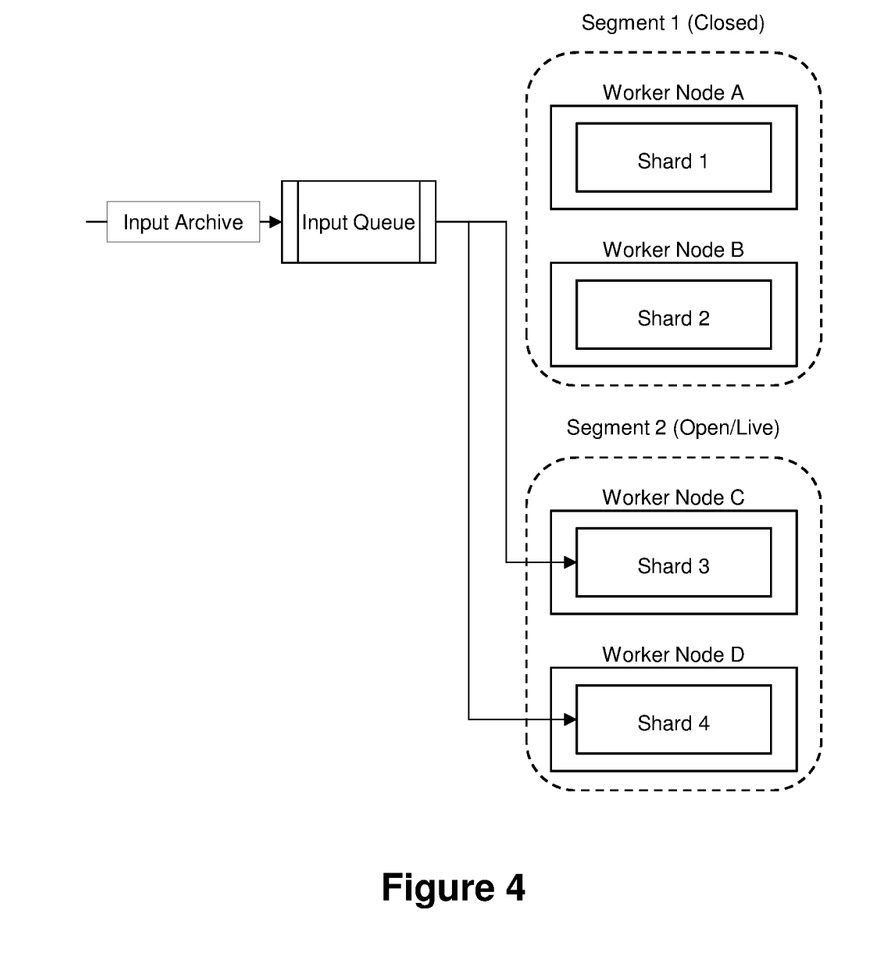
FIG. 4 is a block diagram of a segment after rotation, in accordance with an embodiment.

FIGS. 3 and 4 illustrate a segment rotation. FIG. 3 illustrates Segments 1 and 2 prior to rotation and FIG. 4 illustrates Segments 1 and 2 after rotation. At any given time, there may be one open segment. As illustrated in FIG. 3, segment 1 is open. Segment 1 includes two active shards: Shard 1 hosted by Worker A and Shard 2 hosted by Worker B. All live shards consume input data from a global message queue. Each of the messages stored in the global message queue contain one file filled with documents to be processed.

Segments may have one of four states: ready, open (also referred to as live), closed, and archived. A segment is in the ready state after being created and prior to data being stored in the segment. A segment is in the live or open state while it is actively being used to store data. A segment is in the closed state when it is no longer accepting data. The data in a segment in the closed state is converted from append-only to read-only. Segments in the closed statement are stored in hot storage. A segment in the archived state is a closed segment which is stored in cold storage.

A segment rotation may be performed based on several pre-configured conditions. The segment rotation may be performed when the current open segment has been open for a duration longer than a threshold. The segment rotation may be performed when the total events or storage in the open segment is greater than a threshold. The segment rotation may be performed when a schema update is scheduled. The segment rotation may be performed when an engine update is scheduled. The segment rotation may be performed when a database administrator requests for a rotation.

Prior to the segment rotation, a new segment may be created. The new segment may include the same number of shards as the number of shards in the current open segment. The shards in the new segment remain in a ready state until the segment rotation is performed.

As illustrated in FIGS. 3 and 4, once the new segment is ready, the segment rotation will be done in one atomic action. This atomic action will include a series of state changes in the underlying key-value store (distributed fault-tolerant key-value store with consensus support). For example, Segment 1 is changed from the open state to the closed state; Segment 2 is changed from the ready state to the open state; Shard 1 in Segment 1 is changed from the open state to the closing state; Shard 2 in Segment 1 is changed from the open state to the closing state; Shard 3 in Segment 2 is changed from the ready state to the open state; and Shard 4 in Segment 2 is changed from the ready state to the open state. Because the state change is atomic, all of the state changes in Segments 1 and 2 are performed successfully, or none of the states are changed. Once the atomic state change has been performed successfully, the rotation is completed.

As illustrated in FIG. 4, after segment rotation, Segment 2 replaces Segment 1 as the open segment. All shards in Segment 1 are closed. All partitions in the closed shards are converted from append-only into read-only data store. Segment 1 may be stored in hot storage upon the partitions being closed, and may then be uploaded to cold storage and transitioned to the archived state. The worker nodes attached to the closed segments will be terminated.

Figure 5:
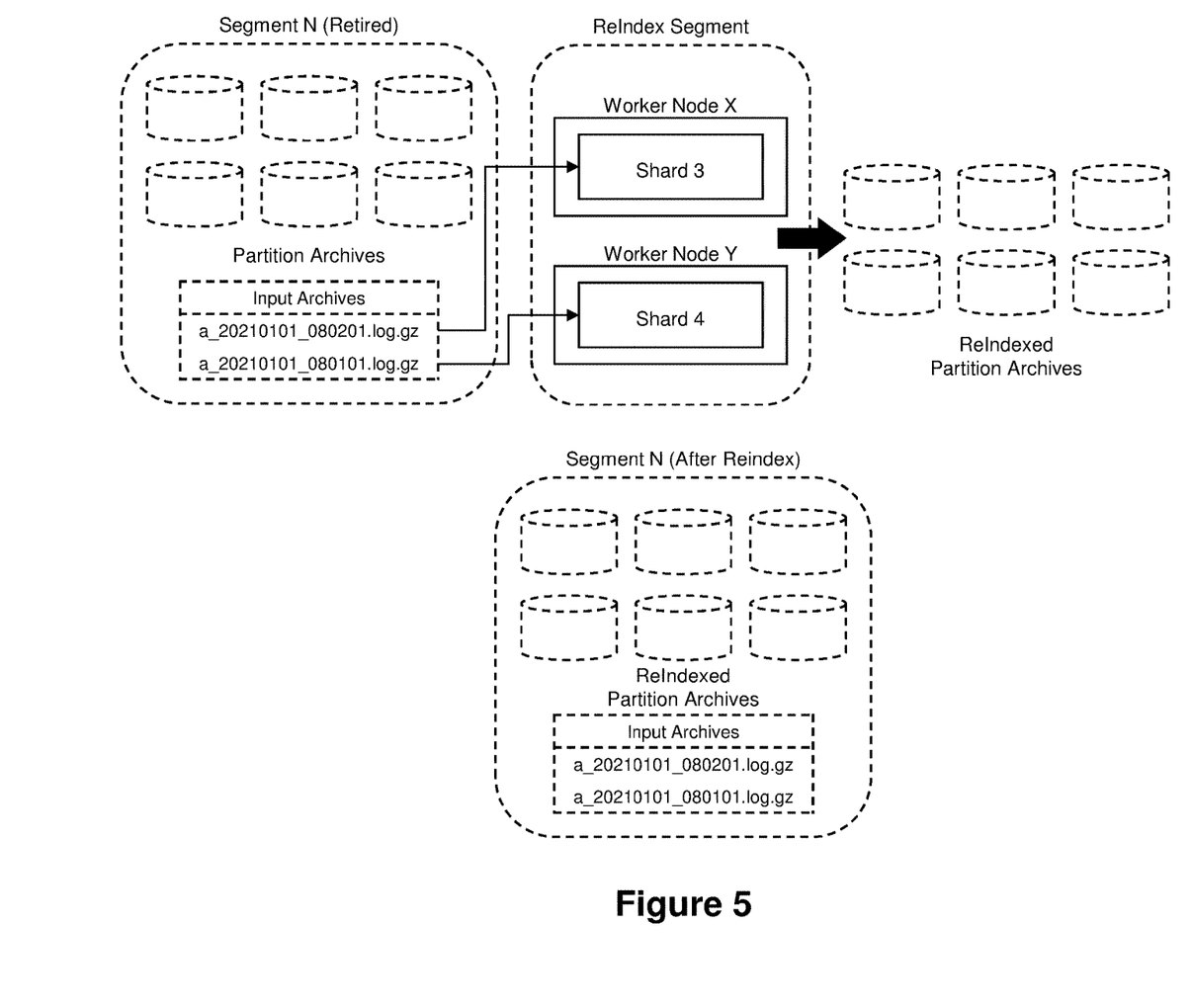
FIG. 5 is a block diagram of a segment rotation, in accordance with an embodiment.

FIG. 5 illustrates segment re-indexing. Each of the closed and stored segments includes a list of input archives, which the segment processed while in the open state. A full-segment re-index may be performed by simply re-playing the saved input archives on another offline segment, thus creating a new indexed and append-only segment. The re-indexed segment could apply different schema and run a different data processing algorithm. The re-indexed segment could also use a different number of shards. After a segment re-index is performed, the archived partition entries in the global partition state may simply be swapped in one atomic action.

Figure 6:
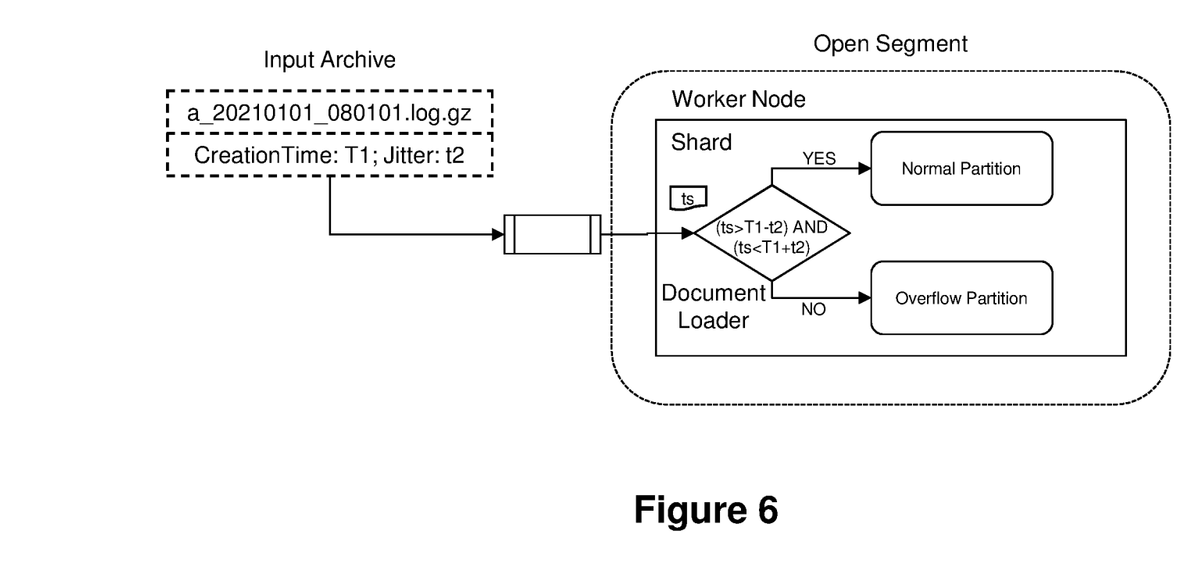
FIG. 6 is a block diagram of a shard and a partition, in accordance with an embodiment.

FIG. 6 illustrates additional details of shards and partitions. Each of the shards is hosted by a single worker node. The number of shards is dynamic. The worker node could be a physical server appliance or a virtual node on the cloud (such as AWS EC2). The input to shard is one file filled with time series documents. Each of the input documents to the shard includes a creation time or timestamp, which is the time when this file was created. In the case of a re-indexed segment the timestamp of the original creation is used. In FIG. 6, the timestamp is represented as T1.

Each of the segments includes a configurable attribute referred to as a jitter. The jitter is the maximum time deviation allowed for the input document timestamp. The jitter may also be referred to as a time window or a jitter window. In FIG. 6, the jitter is represented as t2. Input documents will be stored in a normal partition as long as the input document timestamp is within the jitter of the time at which the input document is received. In FIG. 6, the time at which the input document is received is represented as ts. As illustrated in FIG. 6, if the time at which the input document is received, ts, is within the range of Ti-t2 to Ti+t2, the input document is stored in the normal partition. Otherwise, the input document is stored in an overflow partition.

A loader process loads documents from the input archive. The loader process extracts the timestamp and dispatches it to a normal partition if the timestamp is within the jitter. If the timestamp is outside of the jitter, the loader process dispatches the document to an overflow partition.

A live partition, normal or overflow, will be closed when a pre-defined condition met, the condition could be one of the following: the total index size has reached a pre-determined threshold; the total number of dictionary terms has reached a pre-determined threshold; the total number of schema fields terms has reached a pre-determined threshold; the total number of documents has reached a pre-determined threshold; or the like.

Limiting the size of the live partitions ensures that each partition holds a finite number of resources. This allows for the search and aggregation of one partition to be performed using one finite set of computation units.

A "live" partition saves all its index and data in a local storage that is directly attached to the worker node. This may include a hard drive attached to an appliance, an EBS volume in an AWS cloud, or the like. A "closed" partition does not accept additional data or updates. An "archived" partition will be uploaded to "cold" storage, such as AWS $S_3$ or the like. The original data copy in the local storage will be destroyed when the partition is uploaded to cold storage. An archived partition can be accessed as a remote mount file directory.

Figure 7:
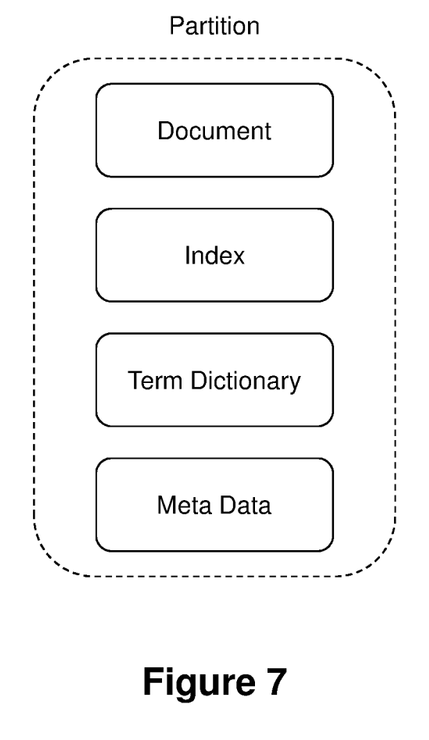
FIG. 7 is a block diagram of a partition, in accordance with an embodiment.

FIG. 7 illustrates state information, which may be included for each of the partitions. All of the state information for each of the partitions are saved in a global state registry.

Figure 8:
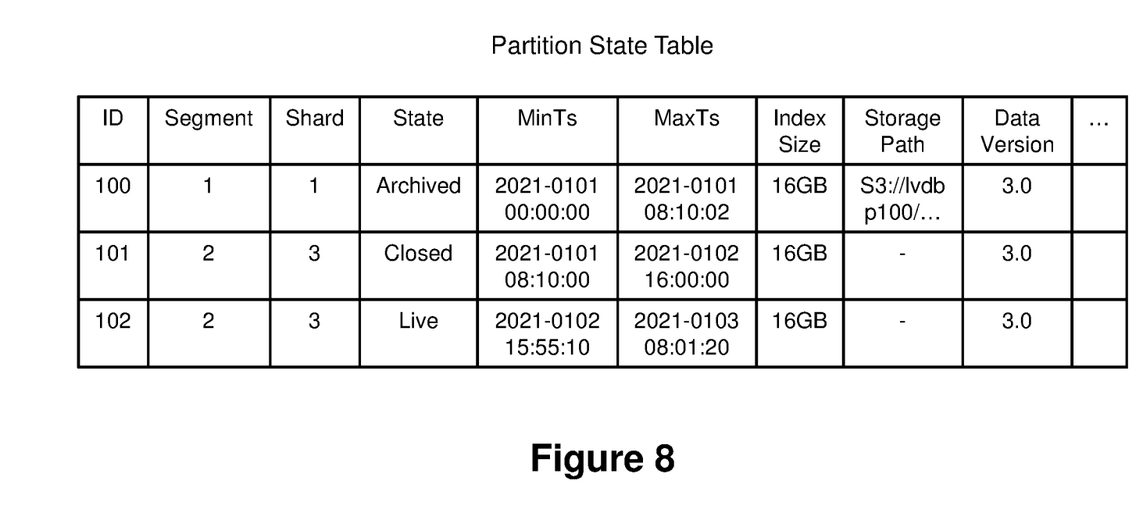
FIG. 8 is a partition state table, in accordance with an embodiment.

FIG. 8 illustrates a partition state stable. Searches may be performed on the indexed data using Lucene-formatted queries. The searches may use data aggregation operations, such as count, sum, unique, groupBy, and the like. Effective search and aggregation commands may specify a time range, such that only the partitions in a given time range are searched.

The system may select all involved partitions by determining whether there are any overlaps between the search range with the event time range of each partition. Because each partition has an upper bound on resources, the exact number of resources needed to perform search and aggregation on any partition is easily determined. A search scheduler may launch the exact number of worker nodes required and assign partitions to given worker nodes to make sure the search by each worker node will be completed around the same time. The search and aggregation result from every partition will be merged to form the result returning to the user.

The search/aggregation command may utilize a larger number of worker nodes than the number used for ingress data processing. For example, a single worker node may be used for data indexing of an incoming data stream, while a search could launch hundreds of worker nodes. This may be limited only by the number of resources available from a cloud service provider or the like.

In accordance with an embodiment, a method of storing data includes receiving an incoming stream of time-series data; storing the time-series data of the incoming data stream in a first segment; and closing the first segment in response to a resource consumption limit of the first segment being reached. In an embodiment, a second segment is created before the first segment is closed, the first segment further including rotating to the second segment in response to a resource consumption limit of the first segment being reached; and storing the time-series data of the incoming data stream in the second segment. In an embodiment, the time-series data includes a plurality of events, each event of the plurality of events including a timestamp, and the method further including storing each event of the plurality of events having a respective timestamp within a preconfigured jitter range in a first partition, the preconfigured jitter range including a time deviation. In an embodiment, the method further includes storing each event of the plurality of events having a respective timestamp outside the preconfigured jitter range in an overflow partition. In an embodiment, the timestamp of each event of the plurality of events indicates an indicated creation time for the respective event. In an embodiment, the method further includes determining whether a preexisting timestamp is attached to each event of the plurality of events; and attaching a timestamp indicating a time received to a respective event of the plurality of events when the respective event of the plurality of events does not include the preexisting timestamp. In an embodiment, a plurality of shards store the time-series data of the incoming data stream in the first segment, each of the shards of the plurality of shards operating in parallel. In an embodiment, the number of shards processing data at any time is dynamic. In an embodiment, each of the shards of the plurality of shards operates with no communication to other shards. In an embodiment, the resource consumption limit includes a pre-configured number of events. In an embodiment, the resource consumption limit includes a pre-configured resource limit. In an embodiment, the first segment is configured to have one of an open state, a closed state, or an archived state. In an embodiment, the method further includes re-indexing the first segment based on an updated schema. In an embodiment, the method further includes moving the time-series data from the first segment to a third segment based on an updated schema. In an embodiment, the first segment is append-only. In an embodiment, the time-series data includes a plurality of input documents, the method further including storing a first portion of the plurality of input documents in a first archive; and attaching a collection time attribute to the first archive.

In accordance with an embodiment, a method of storing data includes receiving an incoming stream of data, the incoming stream of data including a plurality of events; detecting whether each event of the plurality of events includes an original timestamp; attaching a supplemental timestamp to each event of the plurality of events when the respective event is detected without the original timestamp, the supplemental timestamp being based on a time at which the respective event is received; storing the events of the plurality of events in a first segment; and closing the first segment in response to a resource consumption limit of the first segment being reached. In an embodiment, the first segment includes a normal partition and an overflow partition, a first event of the plurality of events being stored in the normal partition when the original timestamp or the supplemental timestamp is within a preconfigured jitter range of a time at which the first event is received. In an embodiment, the first event of the plurality of events is stored in the overflow partition when the original timestamp or the supplemental timestamp is outside the preconfigured jitter range of a time at which the first event is received.

In accordance with an embodiment, a method of storing data includes receiving an incoming stream of time-series data; storing the time-series data of the incoming data stream in a first segment, two or more active shards processing the time-series data, the two or more active shards processing the time-series data in parallel, and the number of the two or more active shards processing the time-series data being dependent on an input rate of the time-series data; and closing the first segment in response to a resource consumption limit of the first segment being reached.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of storing data, the method comprising:
receiving, by a first node, an incoming data stream of time-series data, the first node hosting a first shard, the first shard having only two active partitions at any one time, the two active partitions of the first shard being a first normal partition and a first overflow partition;
receiving, by a second node, the incoming data stream of time-series data, the second node hosting a second shard, the second shard having only two active partitions at any one time, the two active partitions being a second normal partition and a second overflow partition;
storing, by the first shard, the time-series data of the incoming data stream in a first segment, the first segment being a computer-readable medium;
storing, by the second shard, the time-series data of the incoming data stream in the first segment;
rotating to a second segment, a third shard, and a fourth shard in response to a resource consumption limit of the first segment being reached, the first segment, the first shard, and the second shard each being closed after the rotating; and
storing, by the third shard and the fourth shard, the time-series data of the incoming data stream in the second segment, the second segment being a computer-readable medium.

2. The method of claim 1, wherein the time-series data comprises a plurality of events, wherein each event of the plurality of events comprises a timestamp, and wherein the method further comprises:
storing, by the first shard, each event of the plurality of events having a respective timestamp within a preconfigured jitter range in the first normal partition, wherein the preconfigured jitter range comprises a time deviation.

3. The method of claim 2, further comprising storing, by the first shard, each event of the plurality of events having a respective timestamp outside the preconfigured jitter range in the first overflow partition.

4. The method of claim 2, wherein the timestamp of each event of the plurality of events indicates an indicated creation time for the respective event.

5. The method of claim 2, further comprising:
determining whether a preexisting timestamp is attached to each event of the plurality of events; and
attaching a timestamp indicating a time received to a respective event of the plurality of events when the respective event of the plurality of events does not include the preexisting timestamp.

6. The method of claim 1, wherein a plurality of shards store the time-series data of the incoming data stream in the first segment, wherein each of the shards of the plurality of shards operates in parallel, the first and second shards being in the plurality of shards, each of the plurality of shards being hosted on a separate node.

7. The method of claim 6, wherein the number of shards processing data at any time is dynamic.

8. The method of claim 6, wherein each of the shards of the plurality of shards operates with no communication to other shards.

9. The method of claim 1, wherein the resource consumption limit comprises a pre-configured number of events.

10. The method of claim 1, wherein the resource consumption limit comprises a pre-configured resource limit.

11. The method of claim 1, wherein the first segment is configured to have one of an open state, a closed state, or an archived state.

12. The method of claim 1, further comprising indexing the first segment based on an updated schema.

13. The method of claim 1, further comprising moving the time-series data from the first segment to a third segment based on an updated schema.

14. The method of claim 1, wherein the first segment is append-only.

15. The method of claim 1, wherein the time-series data comprises a plurality of input documents, wherein the method further comprises:
storing a first portion of the plurality of input documents in a first archive; and
attaching a collection time attribute to the first archive.

16. A method of storing data, the method comprising:
receiving an incoming stream of data, by a first virtual node and a second virtual node, the incoming stream of data comprising a plurality of events, the first and second virtual nodes being virtual nodes on cloud hardware;
storing, by the first and second virtual nodes, a supplemental timestamp with each event of the plurality of events when the respective event is detected without an original timestamp, wherein the supplemental timestamp is based on a time at which the respective event is received;
storing, by the first and second virtual nodes, the events of the plurality of events in a first segment, the first segment being stored in a computer-readable data store;
in response to a resource consumption limit of the first segment being reached, receiving the incoming stream of data, by a third virtual node and a fourth virtual node, the third and fourth virtual nodes being virtual nodes on cloud hardware; and
storing, by the third and fourth virtual nodes, the events of the plurality of events in a second segment, the second segment being stored in a computer-readable data store.

17. The method of claim 16, wherein the first segment comprises a normal partition and an overflow partition, wherein a first event of the plurality of events is stored in the normal partition when the original timestamp or the supplemental timestamp is within a preconfigured jitter range of a time at which the first event is received.

18. The method of claim 17, wherein the first event of the plurality of events is stored in the overflow partition when the original timestamp or the supplemental timestamp is outside the preconfigured jitter range of a time at which the first event is received.

19. The method of claim 18, wherein each of the first and second virtual nodes only have two active partitions at any one time, the two active partitions being a normal partition and an overflow partition.

20. A method of storing data, the method comprising:
receiving, by a first plurality of nodes, an incoming stream of time-series data;
storing the time-series data of the incoming data stream in a first segment, the first segment being stored in a computer-readable medium, wherein a first plurality of shards store the time-series data of the incoming data stream in the first segment, wherein each of the shards of the first plurality of shards operates in parallel, and wherein each of the shards of the first plurality of shards is hosted on a different node of the first plurality of nodes;
in response to a resource consumption limit of the first segment being reached, receiving, by a second plurality of nodes, the incoming stream of time-series data; and
storing the time-series data of the incoming data stream in a second segment, the second segment being stored in a computer-readable medium, wherein a second plurality of shards store the time-series data of the incoming data stream in the first segment, wherein each of the shards of the second plurality of shards operates in parallel, and wherein each of the shards of the second plurality of shards is hosted on a different node of the second plurality of nodes.

* * * * *